(No Model.) 2 Sheets—Sheet 2.
J. BOLLINGER.
HARROW AND ROLLER.
No. 396,068. Patented Jan. 15, 1889.
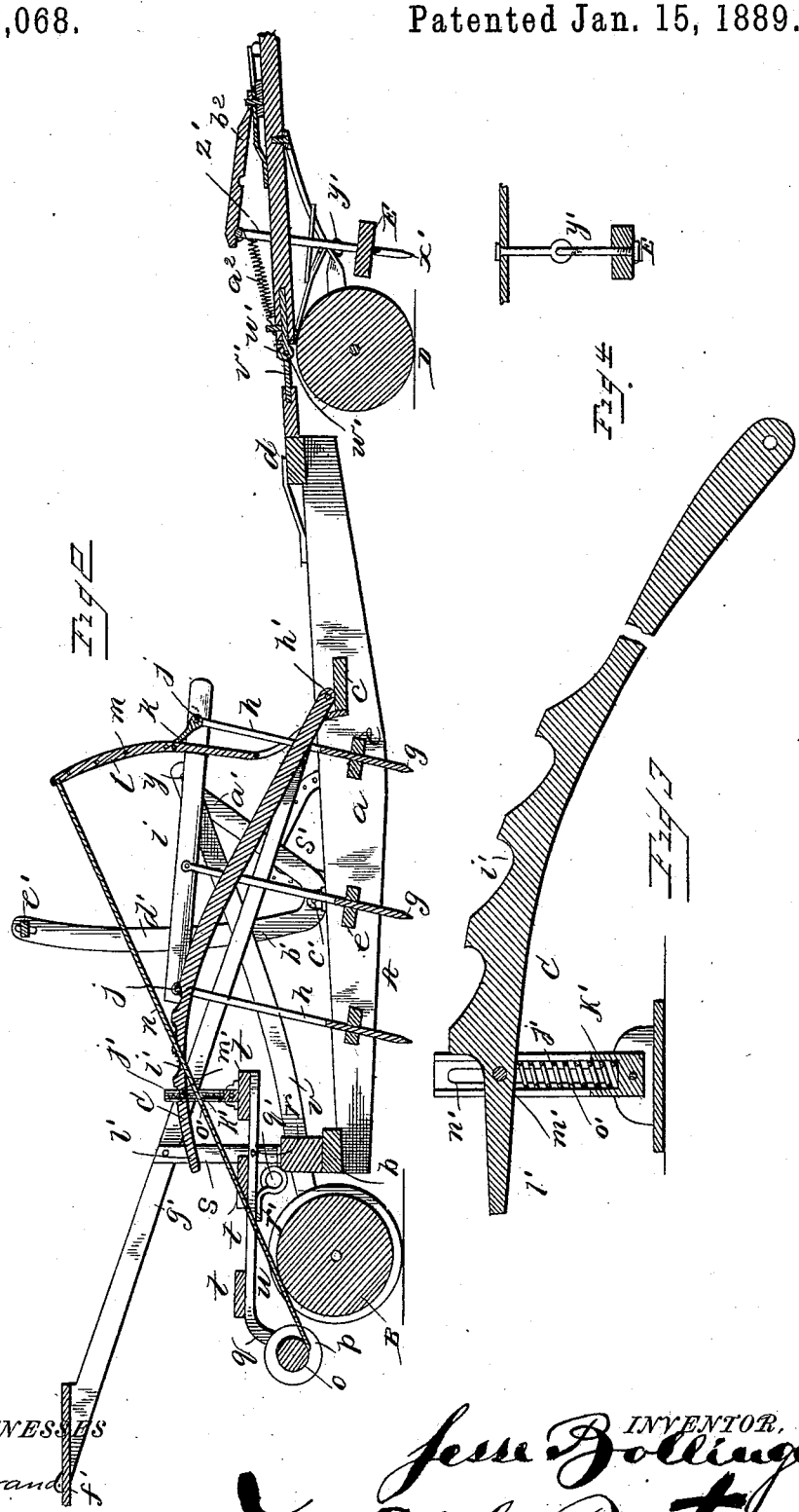
WITNESSES
F. L. Ourand
M. L. Byng
INVENTOR,
Jesse Bollinger
by E. H. Bates
Attorney

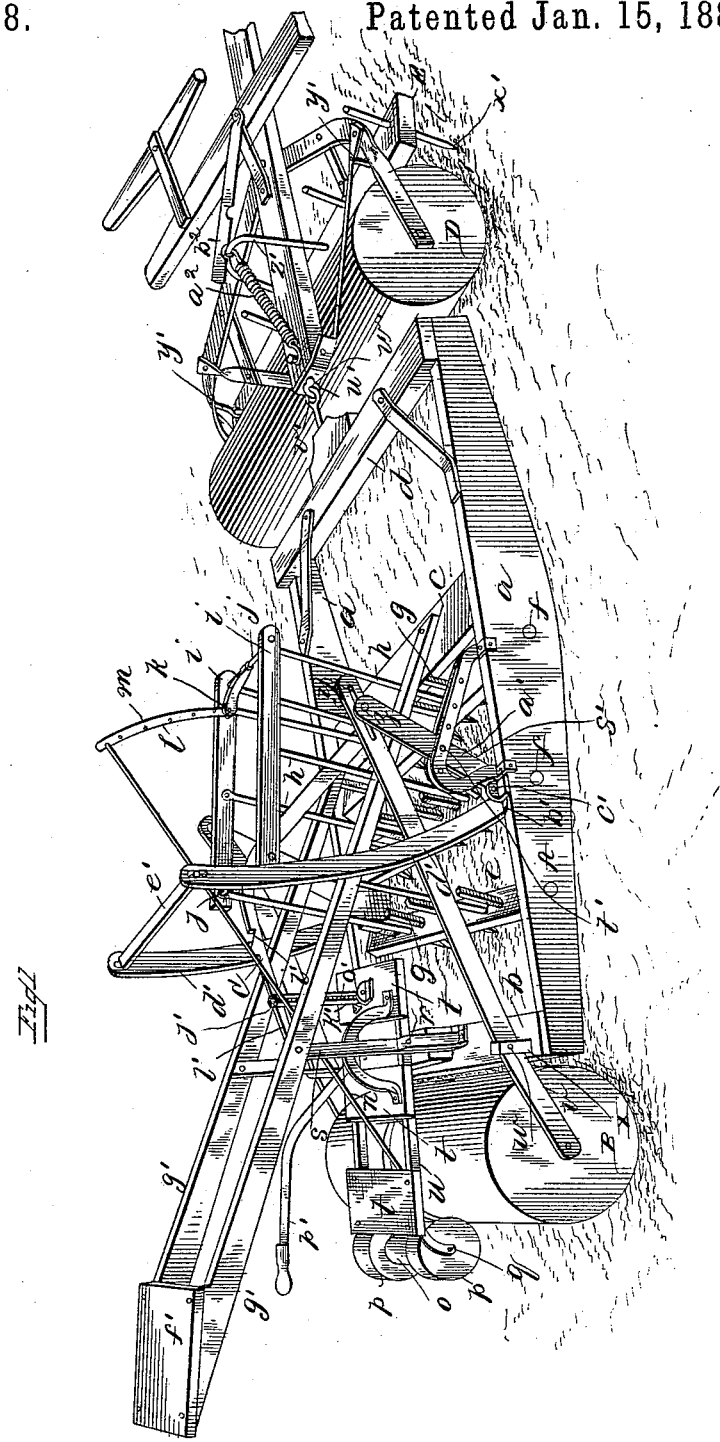

UNITED STATES PATENT OFFICE.

JESSE BOLLINGER, OF CARROLLTON, MARYLAND.

HARROW AND ROLLER.

SPECIFICATION forming part of Letters Patent No. 396,068, dated January 15, 1889.

Application filed September 17, 1888. Serial No. 285,655. (No model.)

*To all whom it may concern:*

Be it known that I, JESSE BOLLINGER, a citizen of the United States, residing at Carrollton, in the county of Carroll and State of Maryland, have invented certain new and useful Improvements in a Combined Harrow and Roller; and I do hereby declare the following to be a full, clear, and exact description of the invention, such as will enable others skilled in the art to which it appertains to make and use the same.

This invention relates to improvements in a combined harrow and roller; and it consists in the novel construction and arrangement of parts, all as will be hereinafter fully described, and more particularly pointed out in the appended claims.

The annexed drawings, to which reference is made, fully illustrate my invention, in which—

Figure 1 represents a perspective view of my device. Fig. 2 is a vertical longitudinal sectional view of the same. Fig. 3 is a detail view of the tube $k'$. Fig. 4 is a detail view of the front harrow.

Referring by letter to the annexed drawings, A designates the harrow-frame, consisting of the parallel side bars, $a$, which are curved on their edges and are connected together by cross-bars $b$, $c$, and $d$. Between the side bars are arranged the revolving tooth-bars $e$, which are journaled at their ends to said side bars, as shown at $f$. These bars $e$ are provided with harrow-teeth $g$, that are securely fastened thereto. Secured to these toothed bars $e$ and arising therefrom are rods $h$, which are pivoted at their end to the horizontal bars $i\,i$, which latter are connected, front and rear, by a cross-bar, $j\,j$, thus forming a pivoted frame above the harrow-teeth. Connected to the front cross-bar of this frame is a forked arm, $k$, which is connected by its outer end to a lever, $l$, having a series of perforations, $m$, thereby affording adjustment of said forked arm in order to give the teeth any desired angle, as will be further explained. This lever $l$ is made fast at its lower end to the middle cross-bar of the frame A.

To the upper end of the lever $l$ is attached one end of a cord or wire, $n$, while the opposite end thereof is connected to a shaft, $o$, between two small rollers, $p\,p$, which revolve together and are journaled in the rear ends of two parallel bars, $q$, that are pivoted at $r$ in uprights $s$ on the rear cross-bar of the frame. These pivoted bars are connected to one another by three cross-pieces, $t\,t\,t$, forming a pivoted platform, $u$, which is operated by the driver's foot in adjusting the harrow.

In rear of the harrow I provide a land-roller, B, which is journaled at its ends to a curved bar, $v$, on each side of the frame A. These bars are pivoted or fulcrumed at $w$ to a short standard, $x$, on the rear cross-bar of the harrow-frame. The forward end of this lever or bar $v$ is slotted, as at $y$, through which passes a pin, $z$, that connects the short arm $a'$ of the angular lever $b'$ with said slotted bar $v$. This angular arm $b'$ is pivoted at $c'$ to the side bar of the harrow-frame, while the long arm $d'$ extends upwardly and the two arms $d'\,d'$ are connected to one another by a cross-rod, $e'$, that serves as a handle for operating the angular arms aforesaid.

The driver's seat $f'$ is bolted to two parallel inclined bars, $g'\,g'$. The forward ends thereof are secured to the middle cross-bar of the harrow-frame, and the same are secured to and are supported on the standards on the rear cross-bar of said harrow-frame, as shown in the drawings.

C indicates a curved lever, the forward end of which is hinged at $h'$ to the middle cross-bar of the frame A, and the same is provided with notches $i'$, either of which is designed to engage the rear cross bar or rod of the pivoted frame. This lever C passes through a slot, $j'$, in a tubular standard, $k'$, leaving an extended end, $l'$, in front of the driver's seat. Passing transversely through this lever is a pin, $m'$, that has its vertical play in slots $n'$ made in the sides of said tube, and within this tube is arranged a coiled spring, $o'$, which extends upwardly against the lower edge of the notched lever aforesaid, and said tubular standard is pivoted at its lower end to plates secured to the front cross-piece of the foot-treadle or frame above the hind roller. This frame also has a hand-lever, $p'$, the forward end of which is rigidly attached to said frame.

On the under side of the foot-treadle or pivoted frame I provide springs $q'$, which are secured by one end to the harrow-frame, while the free outer ends bear upwardly against the under side of the foot-platform, as at $r'$, thereby keeping the small rollers from engagement with the land-roller when the machine is in operation.

On the sides of the harrow-frame I provide bars $s'$, which are perforated to receive a pin, $t'$, which is designed to hold the short arm as well as the entire angular lever in a desired position.

D represents a land-roller, which is arranged in front of the harrow, and the same is journaled to an iron frame secured to the draft-tongue, as shown in the drawings.

The rear end of the draft-tongue is provided with a clevis, $u'$, which is connected to the harrow-frame by a hook, $v'$, entering the eye $w'$ on said clevis, thus providing a swivel-connection between the draft-tongue and harrow.

E designates a single harrow-bar having the teeth $x'$, and the same is hinged at $y'$ to the iron frame of the draft-tongue. This bar is provided about its center with a loop-iron, $z'$, which spans the tongue, and connected to the same is a coiled spring, $a^2$, that is by its other end connected to a bolt on the rear end of said tongue. A catch-hook, $b^2$, on the tongue serves to hold the harrow-teeth not only in a vertical position, but to hold them off the ground when it is desired.

Having thus fully described the several parts of which my device is composed, I will now proceed to describe its operation.

It will be observed from the above description and by reference to the annexed drawings that when the harrow-teeth are in their normal position for harrowing the ground the pivoted frame above the teeth is held firmly in place by the notch in the curved lever, thereby resisting the strain from the teeth, and when it is desired to relieve said teeth from rubbish collected thereon the driver presses upon the extended end of said lever, which causes the notch to disengage from the rear cross-rod of the pivoted frame. The same can also be accomplished by raising the hand-lever on the foot-treadle or platform. These movements will then cause the teeth to partially revolve and assume nearly a horizontal position, thus allowing what rubbish that had accumulated to pass out to the rear of the machine, after which, in order to cause the teeth of the harrow to assume their normal position for harrowing, the driver presses upon the pivoted platform, thus causing the small rollers to engage the land-roller at the same time the horses are moving forward, and by such engagement said rollers are caused to turn, thereby winding upon its axle or shaft the cord, which latter draws rearwardly the upper end of the vertical bar, and by means of the forked arm throws the pivoted frame rearwardly, thus causing the teeth to assume their first position. This movement is continued until the rear bar of the frame drops in the notch on the lever. The driver then releases the foot-platform, and the springs beneath it force it to rise, thus disengaging the small rollers from the land-roller, and when it is desired to give the teeth of the harrow a forward pitch the cross-bar in the frame is caused to engage the other notch in the lever aforesaid.

The hand-lever connecting the two angular levers together is used for the purpose of raising the rear roller or lowering it. By forcing said lever rearwardly the roller is pressed onto the ground and causes the harrow to rise and clear the same, and by forcing the lever forward teeth are caused to enter the ground at different depths. This operation is caused through the medium of the curved bars and angular lever-bars, and the latter is held in different positions by the pin passing through the perforated bar on the side bars of the harrow-frame and in front of the short arm of the angular lever.

The front roller is arranged to admit of it turning in a small space, and the front harrow is held in a vertical position by the coiled spring, which gives when there is rubbish accumulated, and allows the harrow to dump, and when relieved of the load the spring causes it to assume its normal position.

The hook on the tongue can be set by its end notch to hold the front harrow firmly, if desired, and the said harrow can be held in a position almost horizontal by placing the other notch in engagement with the loop spanning the tongue.

What I claim is—

1. In a combined land-roller and harrow, the combination, with the pivoted harrow-bars, of the pivoted frame secured thereto, the curved lever having the notches, the tubular standard provided with the coiled spring, angular lever, slotted curved pivoted side bars for the rear roller, the tilting frame provided with the small rollers and the cord, and the vertical lever connected to said cord and to the pivoted frame and harrow-frame, substantially as described.

2. The combination, with the harrow-frame provided with the teeth and the operating parts connected thereto, as described, of the front harrow hinged to the frame of the tongue and provided with the loop-bar, coil-spring, and retaining-hook pivoted to said tongue, substantially as described.

In testimony whereof I affix my signature in presence of two witnesses.

JESSE BOLLINGER.

Witnesses:
EMORY H. BATES,
JAMES A. MITCHELL.